C. J. VAN BUREN & L. A. KRUPP.
DITCHING MACHINE.
APPLICATION FILED SEPT. 4, 1908.
929,732.
Patented Aug. 3, 1909.
6 SHEETS—SHEET 5.
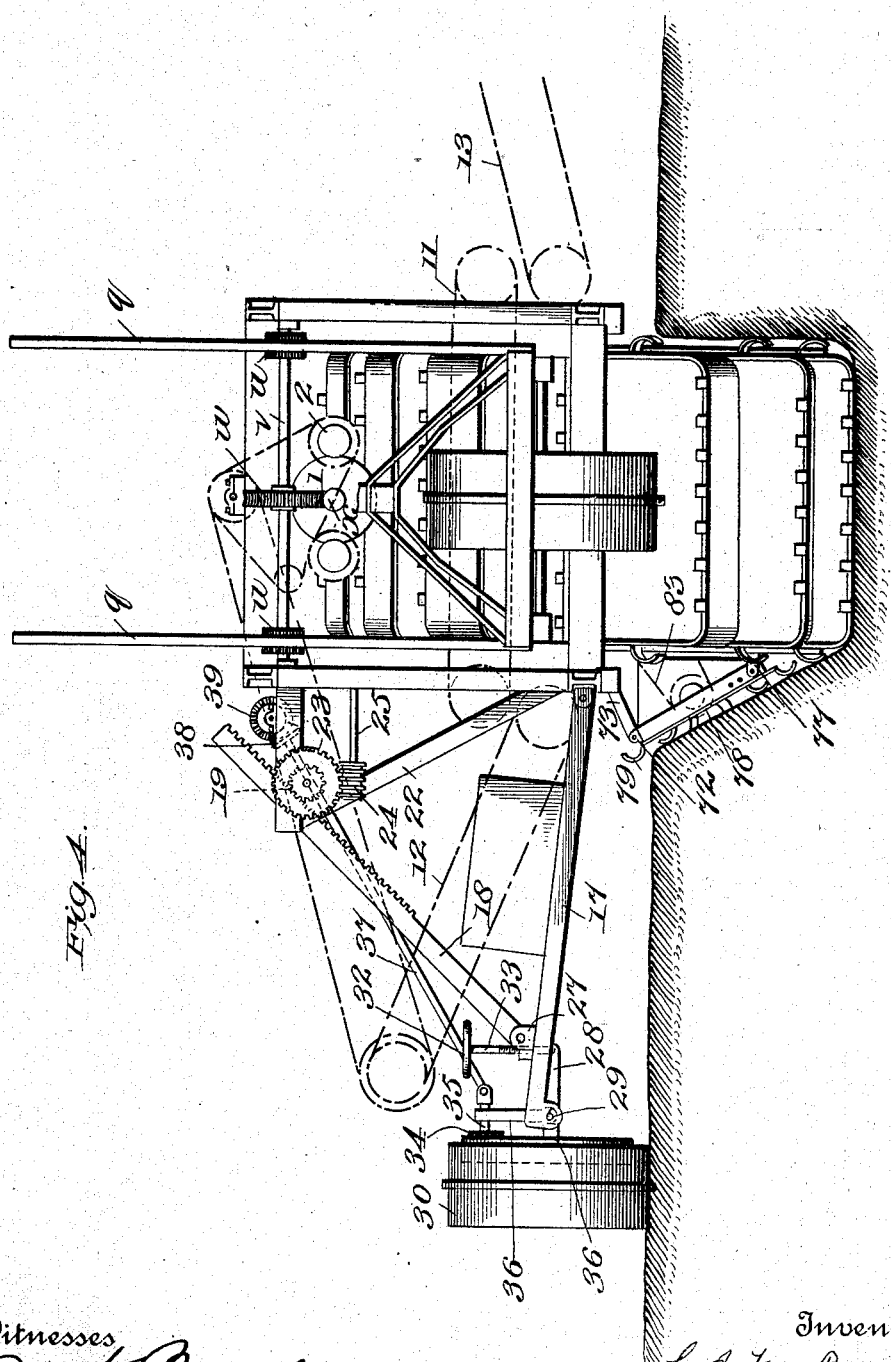
Witnesses
Inventors
C. J. Van Buren.
L. A. Krupp.

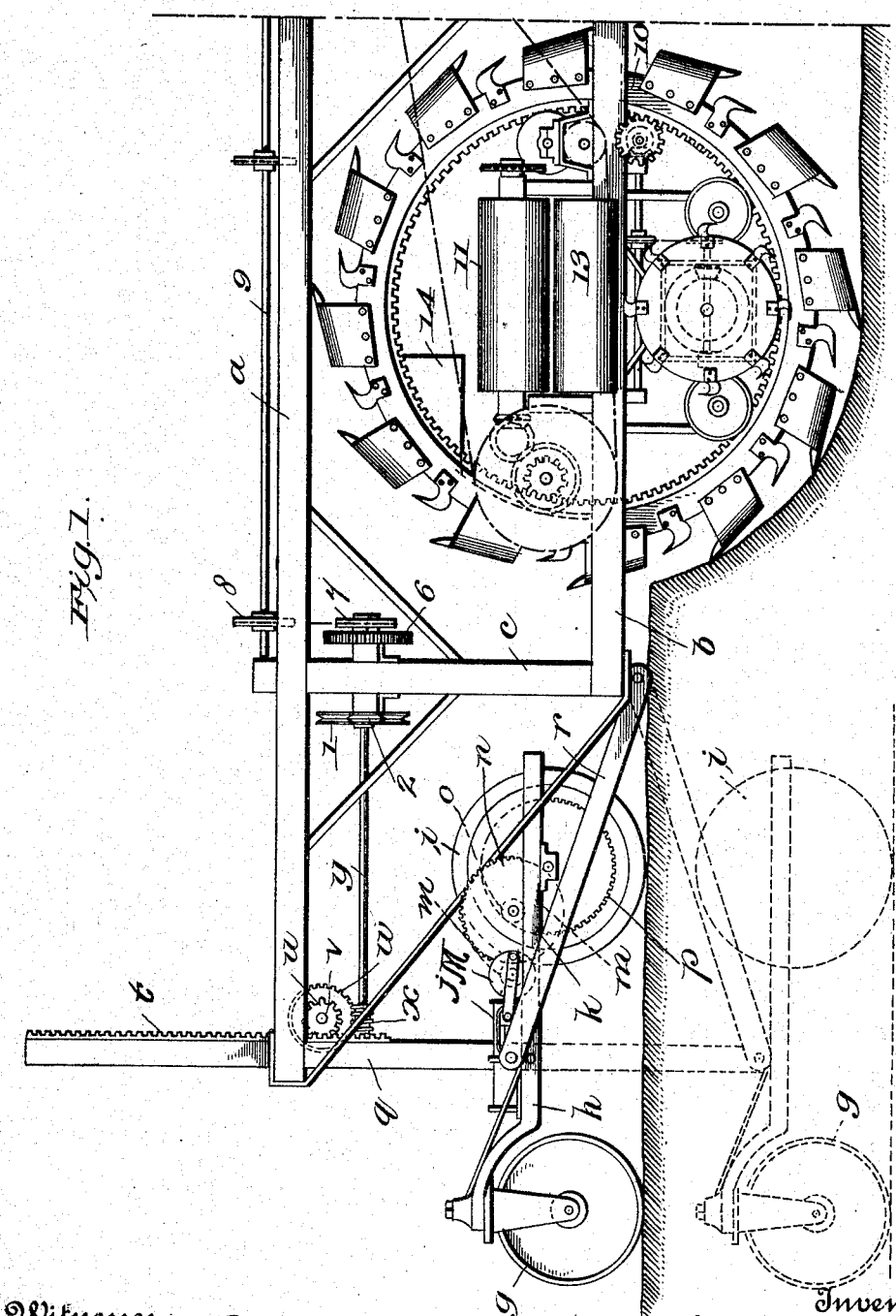

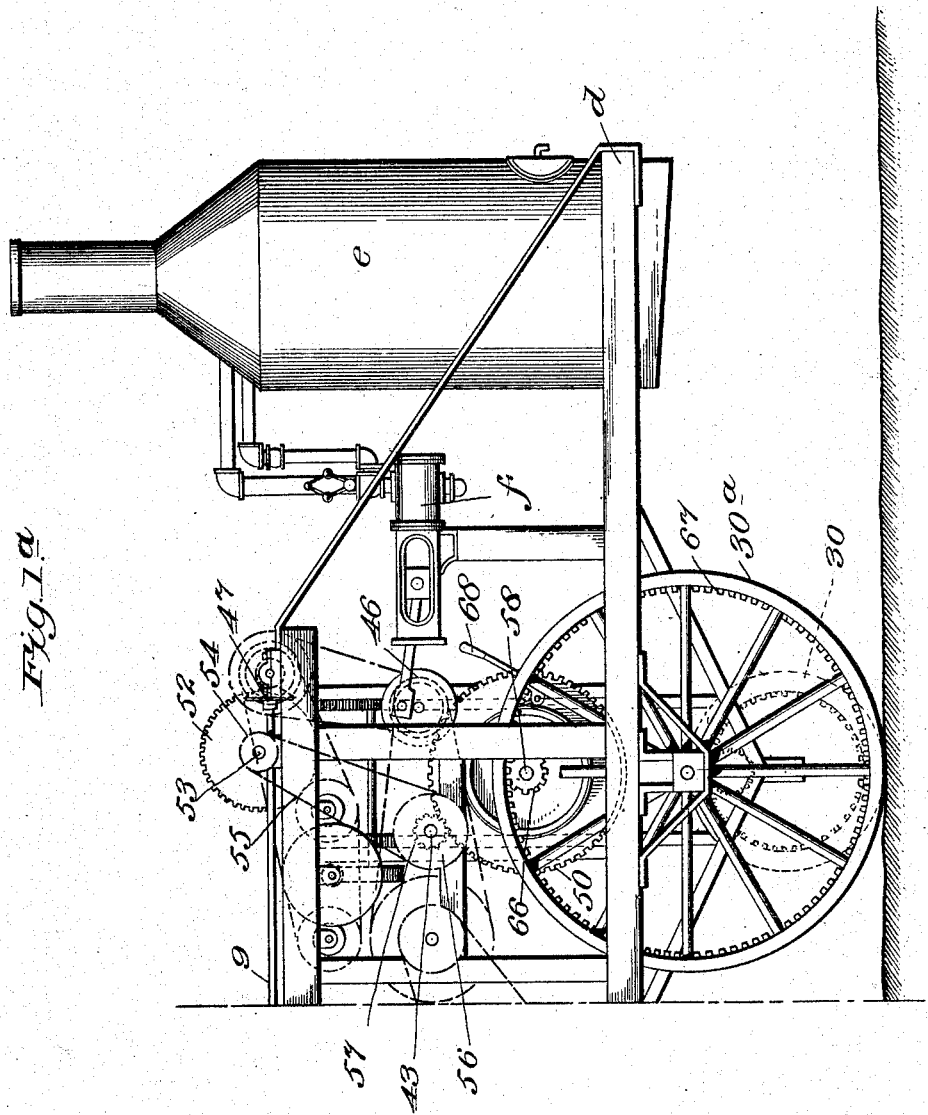

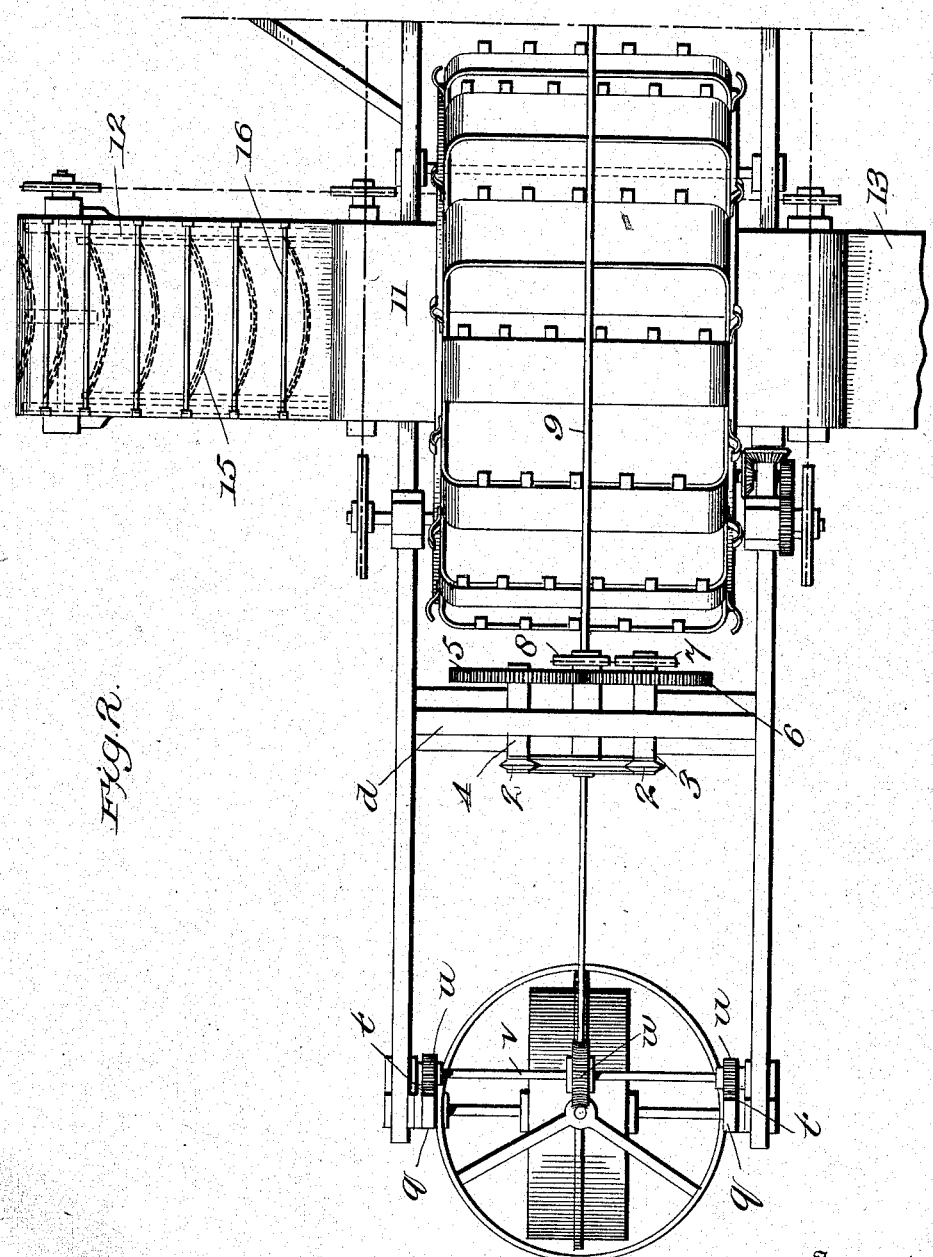

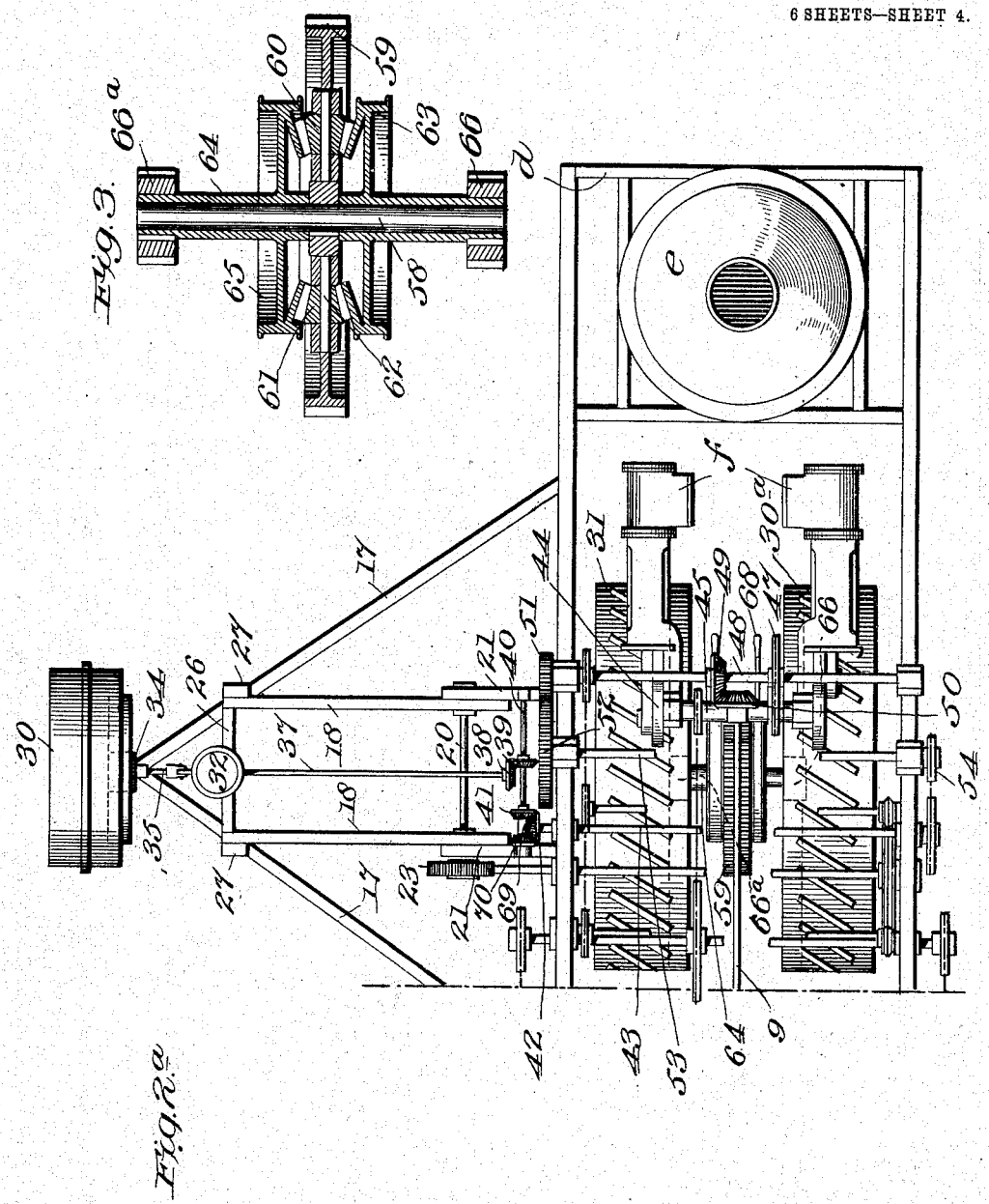

C. J. VAN BUREN & L. A. KRUPP.
DITCHING MACHINE.
APPLICATION FILED SEPT. 4, 1908.

929,732.

Patented Aug. 3, 1909.
6 SHEETS—SHEET 6.

UNITED STATES PATENT OFFICE.

CHARLES J. VAN BUREN, OF CAMBRIDGE, NEW YORK, AND LEO A. KRUPP, OF CAREY, OHIO.

DITCHING-MACHINE.

No. 929,732.  Specification of Letters Patent.  Patented Aug. 3, 1909.

Application filed September 4, 1908. Serial No. 451,685.

*To all whom it may concern:*

Be it known that we, (1) CHARLES J. VAN BUREN and (2) LEO A. KRUPP, citizens of the United States, residing at (1) Cambridge, (2) Carey, in the county of (1) Washington, (2) Wyandot, and State of (1) New York, (2) Ohio, have invented certain new and useful Improvements in Ditching-Machines; and we do hereby declare the following to be a full, clear, and exact description of the invention, such as will enable others skilled in the art to which it appertains to make and use the same.

This invention relates to improvements in ditching machines, and is an improvement upon the machine shown in Patent No. 872,159, C. J. Van Buren, dated Nov. 26, 1907.

The present machine is adapted for cutting either large or small canals, or ditches of any desired depth or width, and with either sloping or straight sides, and either a straight or curved ditch or canal.

The object of this invention is to produce a machine which will cut a ditch or trench either to the full or partial depth (depending on the nature of the soil) at one cut and which will dump the earth on either side of the trench. When the machine has completed this cut, for either the entire length of the canal or trench or for its station, it can be reversed and be brought alongside of the first cut, thus making a canal or trench double the width of the cutting wheel. This operation can be repeated as often as is necessary to obtain the desired width and as often as necessary to cut the desired depth. The machine is thus of almost universal application for any kind of ditch, canal or excavation, and, with the side sloping attachment, it is an ideal machine for the excavation of trenches along highways or for the building of embankments for irrigation works and canals, and generally for any ditching purposes.

Having in view the objects stated above, this invention consists in the construction and combinations of parts as hereinafter described and claimed.

Figure 5:
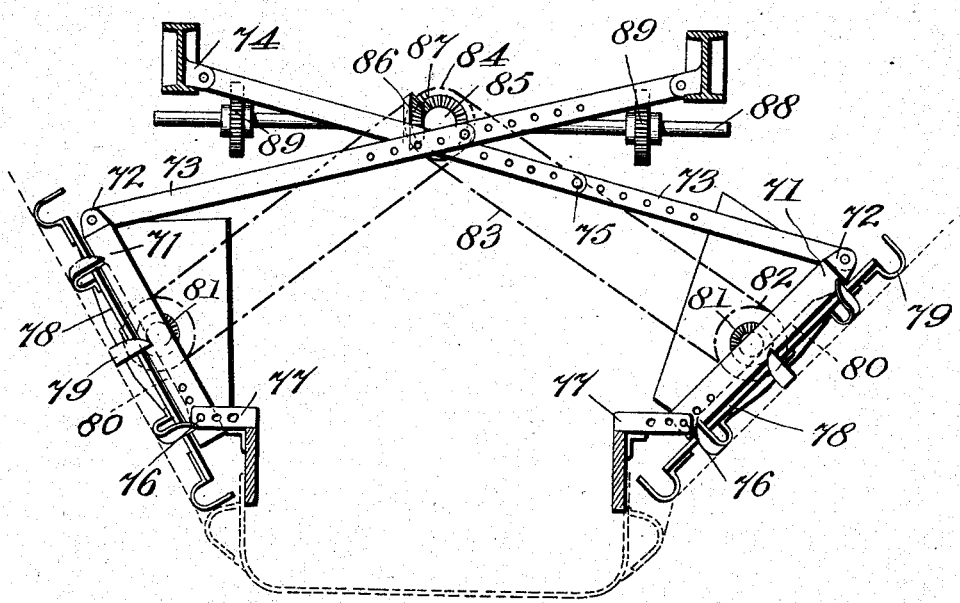
Figure 6:
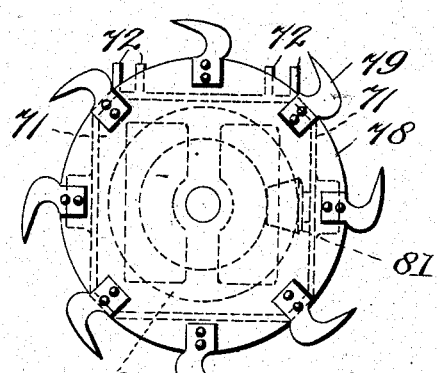

In the accompanying drawings:—Figures 1 and 1ª, which are to be considered together, show a side view of the invention. Figs. 2 and 2ª, which are to be taken together, show a top plan view of the invention, but with a modified form of the guiding or steering devices. Fig. 3 is a cross section of the differential gearing. Fig. 4 is an end view of the machine, parts being shown diagrammatically. Fig. 5 is a cross section showing the supporting frame, the sloping attachments and the connections for driving them, and Fig. 6 is a bottom plan view of one of the attachments for sloping the sides of the excavation.

The main frame is substantially rectangular in plan view and consists of upper longitudinal beams $a$ and lower longitudinal beams $b$ connected together by vertical beams $c$ and cross beams $d$, the whole forming an open frame firmly connected together. On the rear of the frame is mounted a boiler $e$ which supplies steam to an engine $f$, and suitable platforms (not shown) are provided for the reception of the water tank and coal receptacle. In the drawing a steam engine and boiler are shown, but it is obvious that any desired source of power, such for example as an explosion engine, may be used. At the front of the machine is located the steering means which consists of a steering wheel $g$ mounted in bearings which swing upon the steering frame $h$. No means for turning the wheel $g$ are shown, but any ordinary means may be employed.

In the form shown in Fig. 1 the frame $h$ is also provided with a traction wheel $i$ pivotally mounted thereon, which traction wheel aids the main traction wheels located near the rear of the machine. This traction wheel $i$ is driven by an ordinary duplex engine $j$ which receives steam from the boiler by a steam pipe (not shown). The pistons of this engine are connected to a crank shaft carrying disks, etc. said shaft carrying a gear wheel $m$ thereon which meshes with a gear wheel $n$, which in turn drives a pinion $o$ meshing with the internal gear teeth $p$ on the wheel $i$, the whole being carried by the frame $h$.

Pivotally connected to the frame $h$ are a pair of upwardly-extending bars $q$, and pivoted to the frame $h$ near its top are radius rods $r$, the other ends of which are pivotally supported on the main frame. The bars $q$ are each provided with a rack $t$ upon one side, each rack engaging a pinion $u$ on a shaft $v$, which shaft carries a wheel $w$ which is operated by a worm $x$ on the shaft $y$.

This structure is for the purpose of raising and lowering the frame $h$, from the position shown in full lines in Fig. 1 to that shown in dotted lines, for example, which has the effect of lifting the front part of the frame and thereby lifting the ditching wheel out of contact with the ground so that the machine may be easily transported from place to place. The depth of the cut made by the ditching wheel is also regulated by the adjustment of the frame $h$. The shaft $y$ has fastened to it a V-shaped friction wheel 1 which engages with correspondingly shaped friction wheels 2 on the shafts 3 and 4, carrying gear wheels 5 and 6 meshing with each other, the shaft 3 being provided with a sprocket wheel 7 driven by a sprocket wheel 8 mounted on a shaft 9 at the top of the machine. The rotation of the shaft 9 will raise or lower the front part of the machine with relation to the frame $h$. This shaft 9 is caused to rotate from the main operating means by suitable gears 50 and 49, see Fig. 2$^a$.

10 represents the main ditching wheel, of the type shown in Patent No. 872,159, and driven in the manner described therein. Within this wheel is mounted the central conveyer 11 adapted to be driven in either direction, and delivering either upon the side apron 12 or the side apron 13, as the case may be.

Within the ditching wheel is located the curved dirt guard, terminating in a hopper 14 for increasing the dumping space for the buckets of the ditching wheel, allowing the latter to be run at a greater speed. The conveyers are made as described in the patent above mentioned, except that they are provided with chains 15 and flat steel bars 16, either one, or both of which, may be used, depending on the nature of the material excavated.

Pivotally attached to the main frame is a triangular frame 17, the outer end of which may be adjusted up and down by means of rack bars 18, Fig. 4, which engage with pinions 19 on a shaft 20, which is mounted in extensions 21, projecting from the main frame. These extensions are braced by the inclined bars 22. The shaft 20 is provided with a worm wheel 23, which is driven by a worm 24 on a shaft 25. The triangular frame 17 is provided with a cross bar 26, and the lower ends of the bars 18 are attached to ears 27 on the frame 17. By means of the connections described it is obvious that the rotation of the shaft 25 will move the outer end of the frame 17 up or down.

28 represents a spindle pivotally mounted the outer end of the frame 17. On is loosely mounted the side leveling which is in line with the main and which serves but also as a It should be noted that the ditching wheel 10 is wider than the space occupied by the main traction wheels, as mounted in the main frame, so that these main traction wheels travel in the cut made by the ditching wheel.

The leveling wheel 30 is adjustable up and down by means of a hand wheel 32 carrying a screw threaded rod 33, which works in a nut carried by the bar 26, and has its lower end pivotally attached to the shaft 28. This leveling wheel, in connection with the adjustable steering devices, maintains the main frame in a vertical position, and the adjusting devices for the leveling wheel are provided for the purpose of keeping the cutting wheel 10 always level.

The leveling wheel 30 is driven by the following means: The wheel 30 is provided with an internal gear, of any suitable type, which gear engages with a gear wheel 34. The gear wheel 34 is mounted in a bearing 36 carried by the outer end of the frame 17, and is connected by a universal joint with the shaft 37, which at its upper end carries a bevel gear wheel 38, which engages with a similar gear wheel 39 on the shaft 40, which is mounted in the extension 21. The shaft 40 carries another bevel gear wheel 41 which engages a similar gear wheel 42 on the shaft 43, which is driven from the main driving mechanism in the following manner: The engine $f$ is a two cylinder engine, and the cranks of these engines are eccentrically pivoted to the disks 44 on the shaft 45, which carries a sprocket wheel 46 connected by a chain to the sprocket wheel 47 on the shaft 48. This shaft 48 is provided with a bevel gear wheel 49 engaging a similar wheel 50 on the shaft 9. The shaft 48 is also provided with a spur wheel 51 which engages with a similar wheel 52 on the shaft 53. On its other end the shaft 53 is provided with a sprocket wheel 54, which is connected by a chain 55 with a similar wheel 56 on the shaft 43, which drives the side leveling wheel. The shaft 43 is also provided with a pinion 57 which engages the differential gear which drives the main traction wheels 30$^a$ and 31. This differential gear is shown in cross section in Fig. 3 and consists of a shaft 58, which has fast thereon the large gear wheel 59, which is cut away for the reception of the bevel gear wheels 60 and 61 carried on short shafts 62 mounted in enlargements of the large gear wheel 59 forming bearings.

Loose on the shaft 58 is a gear wheel 63, having teeth engaging the bevel gears 60 and 61 and provided with a flat rim for the reception of a band brake. This gear 63 has an elongated hub carrying a pinion 66. Loosely mounted on the shaft 58 is a sleeve 64 which forms the central part of a gear wheel 65, which is provided with teeth engaging the gears 60 and 61 and with a brake rim. On the hub of this gear is a pinion 66ª. The shaft 58 is provided with a pinion 66 which engages with the internal gear teeth 67 on the traction wheel 30ª and the traction wheel 31 is similarly driven by a pinion 66ª on the sleeve 64. One of the band brakes is shown on Fig. 1ª, 68 being the operating handle. By this construction, it is obvious that, if only one of the brakes is applied, the power will be delivered to the gear wheel on the opposite side and thence to the corresponding traction wheel, making it an easy matter to turn the machine to cut a curved ditch. The power may be supplied to either or both of the traction wheels, as desired. The turning action is of course aided by the operation of the steering wheel and can be still aided by reversing the direction of rotation of the leveling wheel 30.

Reversing means are shown in Fig. 2ª. On the shaft 40 is located a friction clutch 70 which engages the bevel gear 41, as already described, and a similar but oppositely located bevel gear 69. By shifting the clutch 70, by ordinary means, either the gear 41 or the gear 70 may be caused to rotate and drive the shaft 40.

The ditching wheel and the conveyers which deliver the excavated material to one side of the ditch are driven from the main operating gearing by sprocket wheels, chains and connections, as described in the patent already referred to.

The means for sloping the sides of the excavation will next be described. These are located alongside the main ditching wheel, below the center thereof.

71 represents a box, provided with ears 72, in which are pivoted the ends of the telescopic stay braces 73, the upper ends of which are pivoted to ears 74 on the main frame. By means of pins 75, the braces may be secured in various positions, the position of the outer side of the box varying accordingly. Two of the sides of the box are provided with a series of holes, with any one of which a pin, as 76, may engage, said pin also engaging any one of a series of holes in a bell crank support 77, which in turn is pivotally mounted on the main frame. By the construction described, any desired adjustment, in or out and up or down, may be obtained. Pivotally mounted on the bottom of the box is a steel disk 78, carrying a series of detachable cutters 79. The disk 78 is provided with a circular row of beveled gear teeth 80, with which a beveled pinion 81 engages. This pinion is mounted on a shaft journaled in the box 71, and having a sprocket wheel 82 connected by a chain 83 with a sprocket wheel 84 on the shaft 85. This shaft 85 is provided with a bevel gear wheel 87, which engages with a similar gear wheel 86 on the shaft 88, which is provided with pinions 89 which mesh with the gear teeth on the main ditching wheel, so that said wheel, as it revolves, drives the slope-making cutter disks.

The whole structure is firmly braced together, to insure strength and rigidity. In various parts of the drawing, some of the construction has been shown diagrammatically. Various important parts, such as bearings for some of the shafts, have been omitted.

It will be understood that various parts of the gearing are usually out of operation, such as the means for raising and lowering the steering truck and leveling frame, and that clutches (not shown) are to be used wherever they are needed.

We make no claim to any special form of traction wheel, or wheels, as any suitable type of wheel or wheels may be adopted. It is also obvious that for larger or smaller machines the arrangement of traction wheels may be varied; for instance, in a machine for digging narrow trenches only one traction wheel in the trench will be used, in which case the side leveling wheel 30 would be necessary. In machines for digging broad trenches at one cut, the leveling effect may be secured by using a pair of traction wheels abreast, in which case the side leveling wheel 30 may be omitted, and the differential mechanism shown in Fig. 3 with its brake bands will be used.

The operation is evident from the foregoing description.

We claim:—

1. In a ditching machine, the combination of a supporting frame, a steering wheel, an open-center ditching wheel and traction wheels, said wheels being arranged in line on said frame in the order named, substantially as described.

2. In a ditching machine, the combination of a supporting frame, an open-center ditching wheel carried thereby and traction wheels mounted in said frame, directly behind said ditching wheel, said ditching wheel being wider than the space occupied by said traction wheels, whereby the latter may travel in the cut made by the ditching wheel, substantially as described.

3. In a ditching machine, the combination of a main frame, a steering truck or frame mounted thereon, and means for adjusting said steering frame on the main frame, substantially as described.

4. In a ditching machine, the combination of a main frame, a steering truck or frame carried thereby, an open-center ditching wheel on said main frame, and means for adjusting said steering frame relatively to said main frame, to vary the depth of the cut made by the ditching wheel or to raise said wheel clear of the ground, substantially as described.

5. In a ditching machine, the combination of a main frame, a ditching wheel carried thereby, a leveling wheel, and means for adjusting said leveling wheel, substantially as described.

6. In a ditching machine, the combination of a main frame, a ditching wheel thereon, an adjustable leveling wheel on said frame, and means for rotating said leveling wheel to assist in the traction of the machine, substantially as described.

7. In a ditching machine, the combination of a main frame, traction wheels, a supplemental frame, and an adjustable leveling wheel on said supplemental frame, parallel to said traction wheels and having its axis in approximately the same vertical plane with the axis of the traction wheels, substantially as described.

8. In a ditching machine, the combination of a main frame, a pair of traction wheels mounted therein, driving means and a differential gear mechanism, whereby power may be applied to either or both of said traction wheels, substantially as described.

9. In a ditching machine, the combination of a main ditching wheel, rotary disks for cutting slopes, and operating means, substantially as described.

10. In a ditching machine, the combination of a main ditching wheel, supplemental rotary disk slope cutting devices, means for adjusting said devices, and operating means, substantially as described.

11. In a ditching machine, the combination of a main ditching wheel, disks provided with detachable cutters for cutting slopes, and operating means, substantially as described.

12. In a ditching machine, the combination of a main ditching wheel, cutter disks for cutting slopes, means for adjusting disks vertically and longitudinally, and operating means, substantially as described.

13. In a ditching machine, the combination of a main ditching wheel, disk cutters for cutting slopes arranged on each side of said main wheel and rotating in the same direction, and operating means, substantially as described.

14. In a ditching machine, the combination of a main ditching wheel, disk cutters, one on each side of said wheel, means for adjusting said cutters up and down and in and out at any desired angle, and connections whereby the rotation of the ditching wheel causes the rotation of the disk cutters, substantially as described.

15. In a ditching machine, the combination of a supporting frame, an open-center ditching wheel, an adjustable conveyer on each side of said wheel, and a conveyer running through said wheel and adapted to deliver the excavated material upon either of said first-named conveyers, as desired, substantially as described.

16. In a ditching machine, the combination of a main frame, conveyers having chain and cross bars thereon, a ditching wheel, and operating means substantially as described.

17. In a ditching machine, the combination of an open-center ditching wheel, and means terminating in a hopper for facilitating the discharge of the excavated material, substantially as described.

18. In a ditching machine, the combination of an open-center ditching wheel, a conveyer passing therethrough, and means terminating in a hopper extending just over the edge of the conveyer for facilitating the discharge of the excavated material, substantially as described.

19. In a ditching machine, the combination of a main frame, a steering frame carried thereby, a ditching wheel, and main traction wheels, said steering frame, ditching wheel and traction wheels being mounted in line on the main frame and in the order named, substantially as described.

In testimony whereof, we affix our signatures, in presence of witnesses.

CHARLES J. VAN BUREN.
LEO A. KRUPP.

Witnesses:
  MOSES ELY,
  JOSEPH S. HUND,
  ARTHUR S. WOODARD,
  F. S. MOORE.